May 28, 1957  L. PENSAK ET AL  2,794,122
VOLTAGE CORRECTION CIRCUITS
Filed Dec. 26, 1952
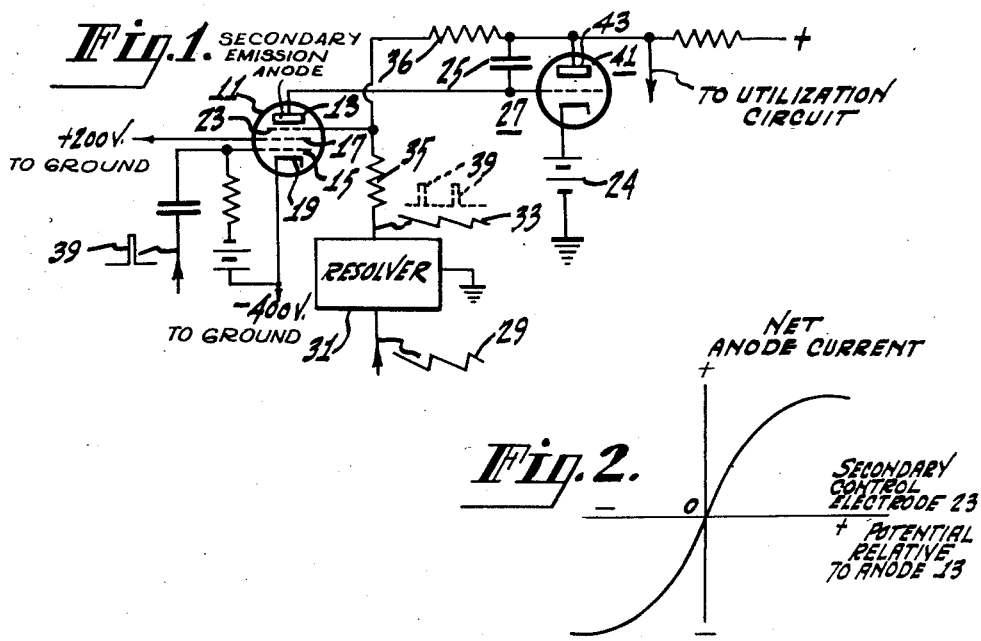
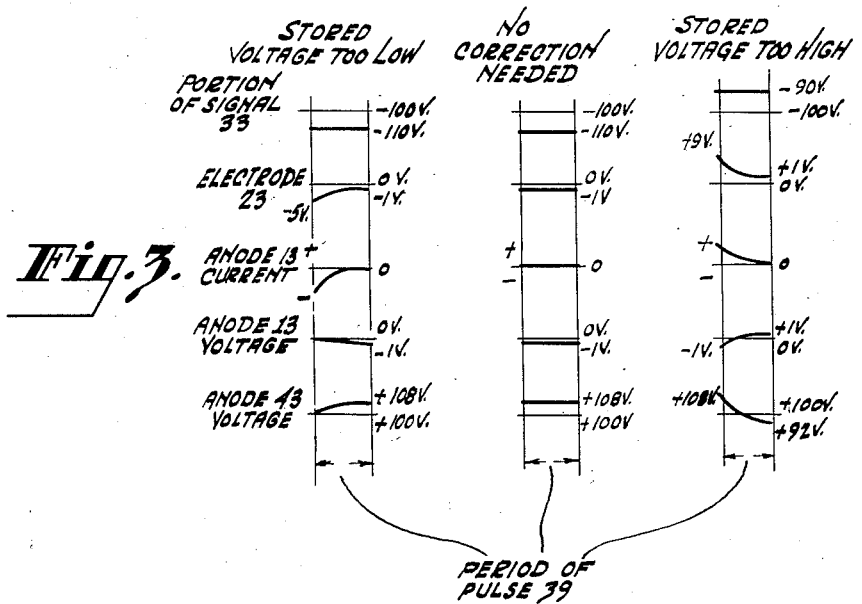
INVENTORS
LOUIS PENSAK
ARTHUR C. STOCKER &
FRANK D. COVELY, 3RD
BY *J. C. Whittaker*
ATTORNEY United States Patent Office 2,794,122
Patented May 28, 1957

2,794,122

VOLTAGE CORRECTION CIRCUITS

Louis Pensak, Princeton, and Arthur C. Stocker and Frank D. Covely 3rd, Collingswood, N. J., assignors to Radio Corporation of America, a corporation of Delaware Application December 26, 1952, Serial No. 328,121

9 Claims. (Cl. 250—27)

This invention relates generally to the storage of electrical data and particularly to a new and improved circuit for periodically correcting data stored in the form of voltage analogues.

The extensive development of the aircraft industry and the increasing numbers of aircraft using the air lanes has aided in bringing about the development of what are termed "Automatic-Track-While-Scan" (ATWS) radar systems. One system of this general class is described in a copending application Serial No. 284,919, filed April 29, 1952, by Frank D. Covely, 3rd. These systems often are extremely desirable in situations where a radar is to automatically track the positions of a plurality of moving objects and, simultaneously, carry on its normal search function. Such systems are particularly useful and effective for airport surveillance and/or airport traffic control. Additionally, ATWS radars may be employed to supply target position data to computers or other circuitry for purposes such as gunfire control, target velocity determination, etc.

In these systems one or more moving radar targets usually are displayed in polar coordinate form on the screen of a P. P. I. (plan-position-indicator) display tube. Certain ones of these targets are selected or designated for tracking purposes. Voltages proportional to the rectilinear coordinates (i. e., the X—Y coordinates) of each target thus selected or designated separately are introduced into "memory" stores such as Miller integrators.

Since the primary purpose of ATWS systems is to automatically track moving radar targets, it is essential that these stored analogue voltages, corresponding to the positional location of each target, periodically be corrected. This correction may be made, for example, for each target once during each radar scansion. In this manner the data stored is up-to-date and is accurate. However, satisfactorily providing this voltage correction poses a difficult problem. The motion of a given target may be such that one or both of its stored analogue voltages either is too large or is too small. This means that the correction circuitry must be responsive to correction signals of either positive or negative polarity. Also, the correction circuits should be effective to provide voltage correction over a wide amplitude range of correction signals yet not provide overcorrection. Particularly this is necessary in instances where rapidly moving targets are being tracked. Moreover, the memory store employed should be insensitive to mild current drains thereon since occasionally the stored analogue voltages may be sampled for desired purposes.

An object of the invention is to provide an improved and simplified circuit for correcting stored electrical data. Another object of the invention is to provide an improved and simplified circuit for correcting electrical data stored in the form of voltage analogues.

A further object of the invention is to provide an improved and simplified voltage correction circuit especially adapted for use in automatic-track-while-scan radar systems.

A further object of the invention is to provide a voltage correction circuit responsive to differently poled correction signals having a wide range of amplitudes.

A still further object of the invention is to provide a voltage correction circuit having feedback for preventing overcorrection.

The invention will be described in detail with reference to the accompanying drawing in which:

Figure 1 is a schematic circuit diagram, partially in block form, of a voltage correction circuit, according to the invention;

Figure 2 is a curve illustrating a secondary control electrode voltage versus net anode current characteristic of a secondary emission tube used in the circuit of Figure 1; and Figure 3 is a series of wave diagrams helpful in describing the operation of the circuit illustrated in Figure 1.

Similar reference characters are applied to similar elements throughout the drawing.

For the purposes of the following description, and in the interest of simplicity, it will be assumed that only one of a plurality of radar targets appearing on the screen of a pictorial display tube (a P. P. I. indicator, for example) has been selected for purposes of automatic target tracking. Additionally, to facilitate the description of the apparatus hereinafter disclosed and claimed, the instant description will be directed to correcting only one of the two analogue voltages corresponding to the positional location of the selected target.

*Secondary emission tube*

Referring to Figure 1, and before describing the operation of the correction circuit of the invention, the operation of a secondary emission tube 11 employed therein will be considered. The tube 11 essentially comprises a pentode type vacuum tube having its anode 13 suitably prepared to provide secondary emission therefrom. The anode secondary emission ratio must be greater than unity and preferably is of the order of two. An anode material providing such an emission characterized may comprise, for example, a silver-magnesium alloy with its surface properly activated. The potentials applied to the control electrode 15 and the screen electrode 17 are adjusted so that the primary electron current flowing from the tube cathode 19 to the secondary emissive anode 13 is constant throughout the operating range of the tube. Also the potential between anode and cathode is sufficient to provide secondary emission from the anode in the amount mentioned above.

The tube is constructed such that the electric field at the surface of the anode 13 is largely determined by the potential impressed on the tube secondary control electrode 23 which is disposed in a region adjacent thereto. This electric field strength determines the number of anode-emitted secondary electrons which pass through the secondary control electrode 23. The secondary electrons which pass the electrode 23 travel to the screen electrode 17 where they are collected.

When the secondary control electrode 23 is at some potential negative with respect to the anode, secondary electron current flowing from the anode is partially suppressed driving the anode negative until the primary current and secondary currents are equal. The net anode current thus increases from a negative value to zero. With a positive potential relative to the anode applied to the secondary control electrode 23 the secondary electron current increases causing the net anode current to be positive. The anode 13 thereby is driven positive until the net anode current again is zero.

The total anode current comprises two current components which are: (1) a fixed primary electron current flowing from the cathode 19 to the anode 13, and (2) a secondary electron current flowing away from the anode 13 toward the screen electrode 17 and having its amplitude controlled by the secondary control electrode potential. The net anode current flowing in an external circuit may have any value between the limits of (a) a negative current value equal to the primary electron current and (b) a positive current value equal to the excess of the secondary electron current over the primary electron current. This relation is shown in Figure 2 of the drawing.

*Voltage correction circuit*

Referring to the several figures of the drawing, the voltage analogue of one of the coordinates of the selected radar target is to be stored in a storage capacitor 25 comprising part of a Miller integrator memory store 27. The memory store 27 includes a normally conductive vacuum tube 41. The storage capacitor 25 is connected between the control and anode electrodes of the tube. It will be assumed that the range of voltage values representative of this range coordinate lie in the range from plus 50 volts to plus 150 volts. Three situations will be described below relating to the correction of this analogue voltage. The first situation is where the capacitor voltage is too low, the second situation where no correction is required, and the third situation where the stored capacitor voltage is too high.

Each time the radar transmitter associated with the ATWS circuitry radiates a high power pulse of radio-frequency energy into space, a negative going sawtooth signal 29 is produced having some predetermined amplitude which is a function of the maximum range of the radar system. The sawtooth signal 29, for example, may comprise the radar range deflection signal. For the instant example, it will be assumed that the amplitude of sawtooth signal 29 varies between minus 50 volts and minus 150 volts. This sawtooth signal 29 is coupled to a resolver 31 which produces a sawtooth output signal 33 having a signal duration equal to that of the input signal 29 but having an amplitude which is proportional either to the sine or cosine of the instantaneous position of the radar transmitting antenna. A suitable resolver for this purpose is a sine or cosine wound potentiometer of the type described at page 284, volume 17 of the M. I. T. Radiation Laboratory Series.

The sawtooth signal 33, from the resolver 31, then effectively is mixed with the analogue voltage to which the Miller integrator storage capacitor 25 is charged. The mixing is achieved by means of a pair of resistors 35 and 36 serially connected between the output of the resolver and the anode terminal connection of the storage capacitor 25. In the present example it will be assumed that resistors 35 and 36 are equal in value. The secondary control electrode 23 of the secondary emission tube is connected to the junction point of these resistors 35 and 36. With the circuitry connected as above described the capacitor voltage and the sawtooth signal voltage 33 are combined in opposing senses. Therefore the voltage with respect to the anode 13 which is impressed on the secondary control electrode 23 at any instant is a constant times the instantaneous difference of these voltages. When resistors 35 and 36 are equal the constant has a value of one-half.

After the radar echo pulse corresponding to the selected radar target has been received and has been shaped to constant width and amplitude, the pulse 39 is applied to the control electrode 15 of the normally-blocked pentode tube 11. The pulse 39 drives the tube into conduction for the period of the pulse. The relative occurrence of the pulse 39 with the respect to the negative going portion of the sawtooth signal 33 chooses the instantaneous value of amplitude and polarity of the potential which is applied to the secondary control electrode 23. This potential in turn determines the value and sense of the net anode current of the tube 11.

For example: Assume that the analogue voltage stored by the capacitor 25 is plus 100 volts relative to ground. Under this condition it also will be assumed that the anode 13 of the secondary emission tube 11 is at ground potential. Battery 24 provides a suitable positive bias for the cathode of tube 41 to enable it to operate with its grid at ground potential. Also assume that the designated target has changed its position and the correct analogue voltage for the new coordinate should be greater than plus 100 volts. The timing of the pulse 39 is such that the secondary emission tube 11 is driven into conduction at the time at which the amplitude of the negative going sawtooth signal 33, for example, is minus 110 volts. Since the plus 100 volt and minus 110 volt potentials are combined in opposing senses, and since resistors 35 and 36 are equal, the potential applied to the secondary control electrode 23 relative to the anode 13 is minus 5 volts. The minus 5 volt potential difference causes partial suppression of the secondary electron current flowing out of the tube anode 13 and exerts negligible control on the primary electron current flowing into the anode. The net anode current at this instant is negative and the anode 13 is driven to a potential negative with respect to ground.

The anode 13 of the secondary emission tube 11 is directly coupled to the control electrode of the Miller integrator circuit tube 41. Thus the anode voltage of the tube 41 increases and the charge on capacitor 25 increases. Since the capacitor voltage continuously is corrected during the period of the timing pulse 39, the minus 5 volt difference signal initially applied to the secondary control electrode 23 gradually is diminished in amplitude. Assuming that the tube 41 has a gain of eight, capacitor 25 charges up to an equilibrium condition such that the secondary control electrode 23 and anode 11 are both at minus one volt with respect to ground. This bias on the grid of tube 41 causes its anode 43 to rise in potential eight volts to plus 108 volts. This rise in anode voltage just balances the minus 110 volts of the signal 33 to produce minus one volt on the secondary control electrode 23. Since both electrode 23 and anode 13 are at the same potential, no net anode current flows and no further correction occurs. The plus 108 volt capacitor charge is the analogue voltage corresponding to one of the new coordinates of the selected target. The above correction circuit thus basically is a system of inverse feedback wherein the amplitudes of two potentials are compared and a difference signal applied to an amplifier. Since the apparatus employs this type of feedback it will be seen that desired correction is attained without disadvantages of overcorrection.

In the second situation mentioned above (where no voltage correction is required) the pulse 39 gates-on the secondary emission tube 11 when the instantaneous value of the negative-going sawtooth signal 33 again is minus 110 volts. The difference signal relative to ground applied to the secondary control electrode 23 is minus one volt. Since anode 13 has remained at a potential of minus one volt the net anode current is zero and no correction occurs. The storage capacitor 25 remains charged to plus 108 volts.

In the third situation assume that the selected target has changed its position such that the analogue voltage stored in capacitor 25 should be lower than the stored voltage. The pulse 39, in this instance, gates on the secondary emission tube 11 at an earlier time, for example, when the instantaneous value of the sawtooth signal 33 is minus 90 volts. The stored potential (plus 108 volts) and the instantaneous sawtooth potential (minus 90 volts) are combined and a difference signal of plus 9 volts relative to ground is applied to the secondary control electrode 23. The secondary electron current in the tube 11 exceeds the primary electron current and the anode of the tube begins to swing to a more positive potential. The current flowing in the Miller integrator circuit tube 41 increases and the voltage to which capacitor 25 is charged (plus 108 volts) decreases. The capacitor discharge continues until the anode 13 and the secondary control electrode 23 of tube 11 are at the same potential. With the previously specified gain of eight for the tube 41, these electrode potentials both are plus one volt with respect to ground. The net anode current again is zero and the corrected analogue voltage is plus 92 volts.

From the foregoing description it is seen that correction of analogue voltages may be achieved rapidly and simply. The correction signals may be either positive or negative in sense and have wide amplitude ranges. Also the utilization of inverse feed-back obviates disadvantages of overcorrection. In the event that it is not desirable to provide a sawtooth voltage which is comparable in range to the capacitor store voltage, any desired range of negative voltages may be employed so long as $$E_{43} = -\frac{R_{36}}{R_{35}} e_{33}$$

where $e_{33}$ is any voltage in the desired range of sawtooth voltages. $R_{36}$ and $R_{35}$ are resistances of serially connected resistors 36 and 35, respectively, and $E_{43}$ is the voltage at the anode of tube 41 representative of the conditions which caused $e_{33}$.

The invention herein disclosed and claimed has been described with principal emphasis on the manner in which the analogue voltage corresponding to a single of two coordinates of a selected target may be corrected. It will be appreciated, however, that a pair of such circuits are necessary to fix the position of the selected target. Also, the instant system is not limited to the tracking of a single target but may be utilized in an automatic-track-while-scan radar system in which a large number of radar targets are to be tracked.

What is claimed is:

1. A voltage correction circuit comprising, a secondary emission type electron discharge device employing an electrode capable of emitting a secondary electron current in excess of a primary electron current incident thereon, a storage device for starting a voltage analogue of a quantity connected to the output of said secondary emission type electron discharge means for comparing the voltage analogue stored in said storage device with a voltage proportional to a new analogue of said quantity for deriving a correction signal representative of a change to be made in said stored voltage analogue, and means coupled to said correction signal deriving means for applying said correction signal to said discharge device to control the intensity of said secondary electron current to effect said change.

2. A voltage correction circuit comprising, a secondary emission type electron discharge device employing an electrode capable of emitting a secondary electron current in excess of a primary current incident thereon, a storage device for storing a voltage analogue of a quantity connected to the output of said secondary emission type electron discharge device, connection means for a source of sawtooth voltage signals, means for selecting a portion of the slope of one of said sawtooth signals having an amplitude value proportional to a voltage to be stored in said storage device, means for combining said sawtooth signal amplitude portion and said device voltage analogue, to produce a correction signal representative of a change to be made in stored voltage analogue, and means for applying said correction signal to said discharge device to control the intensity of the secondary electron current of said discharge device for controlling the amplitude of said voltage analogue and effecting said change.

3. Apparatus as claimed in claim 2 wherein said sawtooth signal portion and said device voltage analogue are combined in opposing senses.

4. A voltage correction circuit comprising, a secondary emission type electron discharge device having an electrode capable of emitting a secondary electron current in excess of a primary electron current incident thereon, a storage capacitor connected to said electrode for storing voltage data, connection means for a source of sawtooth voltage signals, means for selecting a portion of the slope of one of said sawtooth signals having an amplitude value proportional to a voltage to be stored by said capacitor, means for combining said selected sawtooth amplitude portion and said capacitor voltage data to produce a correction signal having a polarity and amplitude representative of a change to be made in said capacitor voltage data, and means for applying said correction signal to said discharge device to control the intensity of the secondary electron current of said discharge device for controlling the charge or discharge of said storage capacitor to effect said change.

5. A voltage correction circuit comprising, an electron discharge device having cathode, anode, and control electrodes, a storage capacitor connected between said control and anode electrodes, a secondary emission type electron discharge device employing an electrode capable of emitting a secondary electron current in excess of a primary electron current incident thereon and an electrode capable of controlling the intensity of said secondary electron current, said secondary emission electrode being coupled to the control electrode of said first-named discharge device, and means for applying a signal to said electrode controlling the intensity of said secondary electron current thereby controlling the electrical charge on said capacitor.

6. A voltage correction circuit comprising, a secondary emission type electron discharge device having an output electrode capable of receiving a primary electron current and emitting a secondary electron current in excess of said primary electron current, an electrode within said secondary emission type discharge device for controlling the intensity of said secondary electron current, a Miller integrator circuit comprising an additional electron discharge device having input and output electrodes and a storage capacitor connected between said input and output electrodes, connection means between the output electrode of said secondary emission type electron discharge device and the input electrode of said additional electron discharge device, and means for applying a signal to said electrode within said secondary emission electron discharge device controlling the intensity of said secondary electron current to control the voltage stored by said storage capacitor.

7. A voltage correction circuit comprising: a first electron discharge device having cathode, anode, and control electrodes; a storage capacitor connected between said control and anode electrodes for storing a voltage analogue of a quantity; a second electron discharge device having a cathode electrode, a control electrode, a secondary emission anode capable of emitting a secondary electron current in excess of a primary electron current incident thereon, and an electrode capable of controlling the intensity of said secondary electron current; a connection between said secondary emission anode and the control electrode of said first electron discharge device; a pair of serially connected resistors connected at one end to the anode electrode of said first electron discharge device and at their junction point to the electrode of said second electron discharge device capable of controlling said secondary electron current, the other end of said serially connected resistors being adapted to be connected to a source of sawtooth voltage waves; and means for applying electrical pulses to the control electrode of said second electron discharge device to control the analogue voltage stored by said storage capacitor.

8. A voltage correction circuit as claimed in claim 7 wherein said resistors are equal in resistance and combine said voltage analogue and said sawtooh voltage waves in opposing sense.

9. A voltage correction circuit as claimed in claim 7 wherein the primary electron current of said second electron discharge device is normally cut off and flows only when said pulses are applied to said control electrode.

References Cited in the file of this patent

UNITED STATES PATENTS

| | | |
|---|---|---|
| 2,270,405 | Black | Jan. 20, 1942 |
| 2,293,177 | Skellett | Aug. 18, 1942 |
| 2,297,522 | Zanarini | Sept. 29, 1942 |
| 2,456,754 | Sziklai | Dec. 21, 1948 |
| 2,594,104 | Washburn | Apr. 22, 1952 |

OTHER REFERENCES

Radiation Laboratory Series, vol. 19, McGraw, Hill—1949.